(No Model.)
N. W. FRENCH.
CHAIN PROPELLER.
No. 413,852. Patented Oct. 29, 1889.
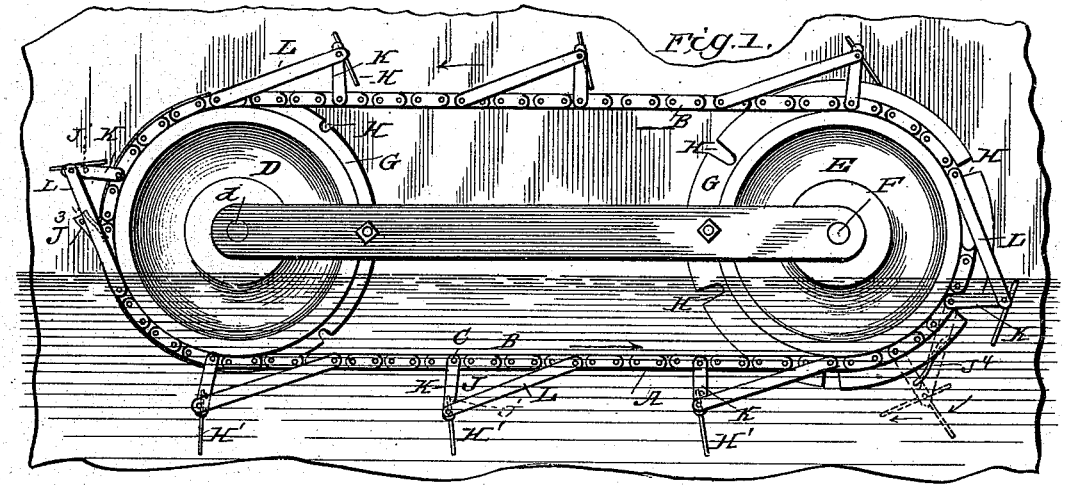
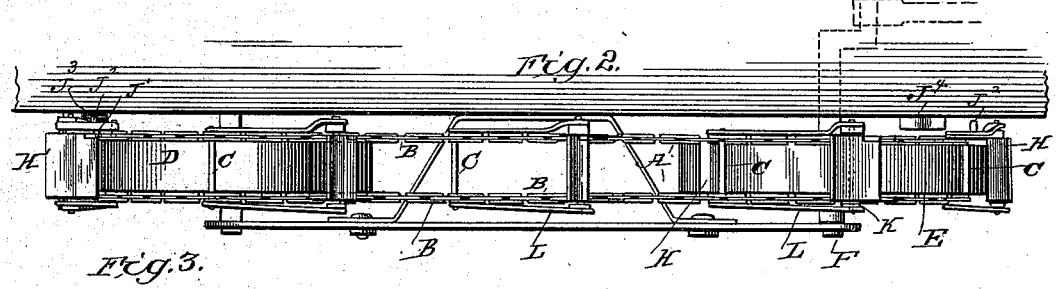
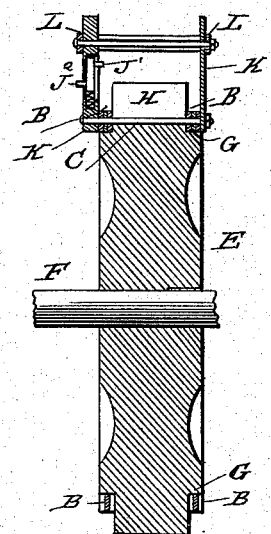
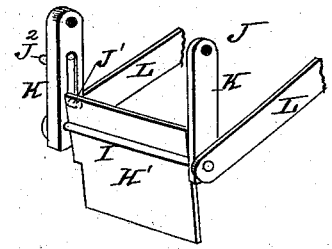
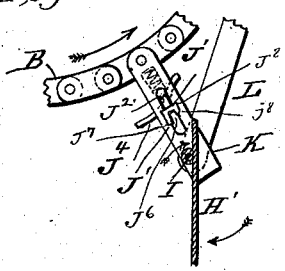
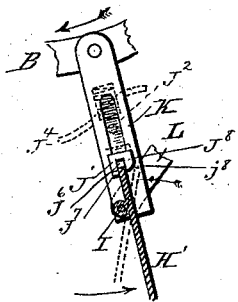
WITNESSES:
Fred G. Dieterich
Jos. A. Ryan
INVENTOR:
Nelson W. French.
BY Munn & Co.
ATTORNEYS.
N. PETERS, Photo-Lithographer, Washington, D. C.

UNITED STATES PATENT OFFICE.

NELSON W. FRENCH, OF TUNKHANNOCK, PENNSYLVANIA.

CHAIN PROPELLER.

SPECIFICATION forming part of Letters Patent No. 413,852, dated October 29, 1889.

Application filed February 6, 1889. Serial No. 298,856. (No model.)

*To all whom it may concern:*

Be it known that I, NELSON W. FRENCH, of Tunkhannock, in the county of Wyoming and State of Pennsylvania, have invented a new and useful Improvement in Chain Propellers, of which the following is a specification.

My invention consists in a new and improved chain propeller, which will be hereinafter fully described and claimed.

Referring to the accompanying drawings, Figure 1 is a side elevation of my new and improved chain propeller, showing the same arranged in operative position. Fig. 2 is a top plan view of the same. Fig. 3 is a transverse section taken through one of the wheels, and Fig. 4 is a perspective detail view of one of the blades and the stop for holding the same in position. Figs. 5 and 6 are detail views of the paddles, which will be hereinafter referred to.

Referring to the several parts by letter, A indicates the double endless chain of my chain propeller, each of the said chains being preferably formed of flat links B B, pivoted together at their ends, as shown, said chains being connected together and caused to travel at the same rate by the transverse rods C, as shown.

D indicates the forward and E the rear drive-wheel, the forward wheel being mounted on and turning with an axle *d*, while the rear drive-wheel is mounted on the drive-shaft F, which can be rotated in any ordinary or desired manner.

Each of the drive-wheels D and E is formed on its bearing-surface at each edge with an annular recess G, in which the endless chains fit in revolving the wheels, and each wheel has formed in its periphery transverse recesses H, in which the transverse rods C fit as the chains pass around the wheels, this arrangement preventing the chains slipping on the wheels, as will be readily understood.

The paddle-blades H' are rectangular, nearly square in shape, and about one-third of the distance from one end have each secured to them a transverse pivot-rod I. Each of the said blades is pivoted in a frame J, which is composed of two radial arms K, the inner ends of which are secured upon the projecting ends of one of the transverse rods C, while upon the projecting ends of the next rod are pivotally mounted the inner ends of brace-rods L. The ends of the pivot-rod I of each paddle-blade are pivoted in the outer ends of a pair of radial arms K and brace-arms L. The endless chains travel in the direction indicated by the arrow in Fig. 1, and as each paddle-blade enters the water beneath the forward drive-wheel at the front end of the boat and travels back the pressure of the water against the face of the paddle-blade will force the same into a vertical position, in which position it will be held by the upper end of the blade coming into contact with a movable stop J', operating in the inner radial arm of the blade-carrying frame. The blades will be held in this vertical position by the pressure of the water and the stop J' during the entire time it is passing through the water from the front to the rear ends of the boat. As each blade passes up beneath the rear half of the rear drive-wheel, the stops J' are automatically raised from contact with the upper ends of the blade and allow the blades to swing in an approximately-parallel position with the drive-chain, as clearly shown in Fig. 1.

The object of allowing the blades to be swung as described is to prevent the blade from offering too much resistance to the water and at the same time prevent them lifting the water when on their upward movement, thereby reducing the friction to a minimum.

As the blades on the upper portion of the chain are moved forward, the lower or heavy ends of the blades will fall into a vertical position against the stop J', and as the blades start on their downward movement at the upper front end of the forward drive-wheel the stops J' will again be automatically drawn back and allow the blades to fall by gravity into a vertical position. As they again enter the water, the stops will have resumed their normal position, and the upper ends of the blades will be pressed against them by the pressure of the water against the lower portion of the blades.

The peculiar arrangement and operation of the stops J' will be readily understood by reference to Figs. 5 and 6 of the drawings, in which it will be seen that said stops are spring-actuated, and each have a projection $J^2$, which at proper intervals engage a curved projection $J^3$, secured to the side of the boat at the front of the forward drive-wheel, and a similar projection $J^4$ on the boat at the lower rear edge of the rear wheel, as shown. It will thus be seen that these stops are automatically operated to release the blades at proper intervals and to automatically spring back in place to engage them, as before described. To admit of the said stops to also hold the blades in a fixed position when it is desired to run the boat backward, I provide the stops $J'$ with a central recess $J^6$, which is formed between the projecting portions $J^7$ and $J^8$, one of which (the forward one) is projected below the other, as shown. The rear projection $J^8$ has its outer face beveled, as at $j^8$. By this construction it will be seen that when the boat is being backed the blades will fall into a vertical position, and, their lower ends being forced outward by the water-pressure, the upper ends will be forced inward, thereby raising the stop slightly, and engage the recess $J^6$, as clearly shown in Fig. 6 of the drawings. When the boat is again started forward, the stops will be released from the blades and they will again assume the positions before described. The object of pivoting the ends of the frame J, as set forth, is to prevent the frames from binding on the chains as the latter pass around the drive-wheels.

From the foregoing description, taken in connection with the drawings, the construction, operations, and advantages of my invention will be readily understood. It will be seen that my new and improved chain propeller is exceedingly strong and simple in construction, having no complicated parts to break or get out of order, while at the same time being very effective in its operation.

Having thus described my invention, what I claim as new is—

1. The combination, with the drive-wheels D E, the endless chains traveling thereon, and fixed projections secured to the side of the boat and disposed one near the lower rear edge of the wheel E and the other near the upper front edge of the wheel D, of blades pivotally secured to the endless chains, as shown, and automatically-operated stops carried by the said chains and normally holding said blades in operative position, said stops adapted to engage the fixed projections on the boat and be thereby released from contact with the blades, substantially as and for the purpose hereinbefore described.

2. The combination, with the drive-wheels D and E, the endless chains mounted thereon, provided with arms K, normal to the chain, and projections $J^3 J^4$, fixedly secured to the sides of the boat and disposed one near the lower rear edge of the wheel E and the other near the upper front edge of the wheel D, of the blades H', provided near the upper portion of their ends with journals, said journals pivoted in the outer ends of the arms K, and automatic stops on one of each pair of arms K, adapted to engage the blades and hold them in position for operation and arranged to engage the fixed projections to release said blades, substantially as and for the purpose hereinbefore described.

3. The combination, with the drive-wheels D E, endless chains mounted thereon, provided with a series of pivoted frames J, consisting of projecting arms K and the brace-rods L, the blades H', pivoted above their central portion in the lower ends of the arms K, and the fixed projections $J^3 J^4$, secured to the sides of the boat and disposed one near the lower rear edge of the wheel E and the other near the upper front edge of the wheel D, of spring-actuated stops secured to one of each pair of said arms K, said stops provided with a head portion $J^5$, provided with a recess $J^6$, a long projecting portion $J^7$, a short projecting portion $j^8$, having a beveled edge, whereby said stop will be raised when the blades H' are operated in a backward direction, thereby causing the upper ends of said blades to engage said beveled portion, raise the stop, and slip into the recess, and a projection $J^2$, adapted to engage the fixed projections $J^3 J^4$, substantially as and for the purpose described.

4. The combination, with the drive-wheels D E, provided with a series of transverse recesses H in their peripheries and annular recesses G G at their peripheral edges, as shown, of the endless chains formed of flat links B, traveling in said annular recesses G, connected by cross-bars C C, adapted to engage the recesses H H in the wheels D E, pivoted frames secured to said chains, the blades pivotally mounted in said frames, as shown, automatically-operated stops secured in said frames J, adapted to normally hold the blades H' in operative position while in motion in the water, and fixed projections $J^3 J^4$, secured to the sides of the boat and disposed one near the lower rear edge of the wheel E and the other near the upper front edge of the wheel D, said automatic stops adapted to engage said projections $J^3 J^4$ and be released from contact with the blades, substantially as and for the purpose shown and described.

The above specification of my invention signed by me in the presence of two subscribing witnesses.

NELSON W. FRENCH.

Witnesses:
SOLON C. KEMON,
CHAS. A. PETTIT.